United States Patent
Hekal

(10) Patent No.: US 6,613,405 B1
(45) Date of Patent: *Sep. 2, 2003

(54) MONOLITHIC COMPOSITION HAVING THE CAPABILITY OF MAINTAINING CONSTANT RELATIVE HUMIDITY IN A PACKAGE

(75) Inventor: Ihab M. Hekal, Greenwich, CT (US)

(73) Assignee: CSP Technologies, Inc., Amsterdam, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/823,355

(22) Filed: Mar. 30, 2001

Related U.S. Application Data

(63) Continuation-in-part of application No. 09/087,830, filed on May 29, 1998, now Pat. No. 6,124,006, which is a continuation-in-part of application No. 08/812,315, filed on Mar. 5, 1997, now Pat. No. 6,130,263, which is a continuation-in-part of application No. 08/611,298, filed on Mar. 5, 1996, now Pat. No. 5,911,937, which is a continuation-in-part of application No. 08/424,996, filed on Apr. 19, 1995, now abandoned.

(60) Provisional application No. 60/193,085, filed on Mar. 30, 2000.

(51) Int. Cl.$^7$ .............................. B01J 20/28; F26B 5/16; B32B 5/18

(52) U.S. Cl. ..................... 428/34.1; 428/35.7; 428/613; 34/95; 252/194; 502/402; 502/405

(58) Field of Search .............................. 428/34.1, 35.7, 428/613; 206/204; 34/95, 329; 53/400, 428, 111; 252/194

(56) References Cited

U.S. PATENT DOCUMENTS 6,124,006 A * 9/2000 Hekal .......................... 428/34.1
6,130,263 A * 10/2000 Hekal .......................... 521/50

FOREIGN PATENT DOCUMENTS

JP 58 011033 * 7/1981

* cited by examiner

Primary Examiner—Suzanne E. McDowell

(57) ABSTRACT

The present invention generally related to a monolithic composition comprising a water insoluble polymer and a deliquescent material. A deliquescent material is blended into the polymer so that the deliquescent material is distributed within the product. The deliquescent material blended in the water-insoluble polymer is capable of maintaining a substantially constant relative humidity in a closed container. The product may be used to form a desired shaped article such as plug type inserts and liners for closed containers, or it may be formed into a film, sheet, bead or pellet.

4 Claims, 11 Drawing Sheets

FIG. 10

| 18-11 | POTASSIUM ACETATE | 30.0000% |
| --- | --- | --- |
| | CARBOPOL | 15.0000% |
| | E4500 | 5.0000% |
| | EXACT 4023 | 50.0000% |
| 18-12 | POTASSIUM ACETATE | 25.0000% |
| | COARSE SILICA | 28.0000% |
| | POLY OX 750 | 5.0000% |
| | EXACT 4023 | 42.0000% |
| 18-15 | POTASSIUM ACETATE | 30.0000% |
| | CARBOPOL | 15.0000% |
| | E4500 | 5.0000% |
| | FT120WV3 | 50.0000% |
| 18-16 | POTASSIUM ACETATE | 25.0000% |
| | COARSE SILICA | 28.0000% |
| | POLY OX 750 | 5.0000% |
| | FT120WV3 | 42.0000% |
| 18-18 | ZINC BROMIDE | 20.0000% |
| | COARSE SILICA | 25.0000% |
| | POLY OX 750 | 5.0000% |
| | FT120WV3 | 50.0000% |

FIG. 11

| Date | 18-11 | 18-12 | 18-15 | 18-16 | 18-18 |
|------|-------|-------|-------|-------|-------|
| 4/21 | 0.5 | 0.5 | 0.5 | 0.5 | 0.5 |
| 4/24 | 1.0 | 0.75 | 1.0 | 0.75 | 0.5 |
| 5/17 | 1.0 | 1.25 | 1.0 | 1.25 | 0.75 |
| 6/7 | - | 1.75 | - | 1.75 | 0.75 |

FIG. 12

| Date | 18-11 | 18-12 | 18-15 | 18-16 | 18-18 |
|---|---|---|---|---|---|
| 4/21 | 36637.0 | 7.9 | 12.2 | 5.1 | 15.9 |
| 4/24 | 36641.0 | 2.6 | 8.0 | 3.9 | 11.1 |
| 4/27 | 39.1 | 16.4 | 60.6 | 29.9 | 5.2 |
| 5/1 | 36.1 | 13.5 | 52.3 | 19.2 | 3.7 |
| 5/4 | 33.8 | 13.5 | 48.3 | 16.9 | 3.2 |
| 5/9 | 30.9 | 13.5 | 44.4 | 15.2 | 2.5 |
| 5/11 | 29.8 | 13.1 | 42.5 | 13.9 | 2.3 |
| 5/16 | 28.1 | 13.1 | 40.7 | 13.9 | 1.9 |
| 5/19 | 27.6 | 25.0 | 40.7 | 42.2 | 41.3 |
| 5/23 | 26.0 | 17.8 | 37.6 | 28.8 | 24.6 |
| 5/25 | 26.0 | 16.4 | 36.4 | 24.5 | 20.0 |
| 5/30 | 26.0 | 16.0 | 35.7 | 22.0 | 15.9 |
| 6/1 | 25.0 | 15.6 | 35.2 | 20.4 | 14.5 |
| 6/6 | - | 15.1 | - | 19.2 | 12.5 |
| 6/8 | - | 25.3 | - | 20.6 | 12.5 |
| 6/12 | - | 19.2 | - | 20.1 | 11.3 |
| 6/14 | - | 18.7 | - | 18.7 | 10.6 |
| 6/20 | - | 17.8 | - | 17.8 | 9.1 |
| 6/26 | - | 18.7 | - | 19.2 | 8.7 |
| 6/28 | - | 18.7 | - | 18.2 | 8.7 |
| 7/3 | - | 26.1 | - | 32.7 | 25.2 |
| 7/7 | - | 27.2 | - | 35.5 | 30.1 |
| 7/10 | - | 26.1 | - | 32.1 | 23.6 |
| 7/13 | - | 25.0 | - | 29.9 | 21.5 |
| 7/19 | - | 25.1 | - | 28.2 | 18.6 |
| 7/24 | - | 24.5 | - | 26.6 | 16.8 |
| 7/27 | - | 24.0 | - | 25.6 | 15.9 |
| 8/2 | - | 24.0 | - | 25.0 | 15.0 |
| 8/7 | - | 24.0 | - | 25.0 | 14.5 |
| 8/14 | - | 24.0 | - | 24.5 | 14.1 |
| 8/17 | - | 23.5 | - | 24.0 | 13.3 |
| 8/21 | - | 23.5 | - | 23.5 | 13.3 |
| 8/24 | - | 23.5 | - | 23.0 | 12.5 |
| 8/28 | - | 23.5 | - | 23.0 | 12.1 |
| 8/31 | - | 23.5 | - | 22.5 | 12.1 |
| 9/5 | - | 23.5 | - | 22.0 | 12.1 |
| 9/7 | - | 23.0 | - | 22.0 | 12.1 |
| 9/11 | - | 23.0 | - | 22.0 | 11.3 |
| 9/14 | - | 23.0 | - | 21.5 | 11.3 |
| 9/18 | - | 23.0 | - | 21.5 | 11.3 |
| 9/21 | - | 23.0 | - | 21.5 | 10.9 |
| 9/25 | - | 23.3 | - | 21.5 | 10.9 |
| 9/28 | - | 22.5 | - | 21.5 | 11.3 |
| 10/2 | - | 22.5 | - | 21.0 | 10.9 |
| 10/5 | - | 24.0 | - | 20.6 | 10.6 |
| 10/9 | - | 23.0 | - | 21.2 | 9.7 |
| 10/12 | - | 23.0 | - | 20.1 | 10.6 |
| 10/16 | - | 23.0 | - | 21.0 | 10.6 |
| 10/23 | - | 23.0 | - | 21.0 | 10.6 |
| 10/31 | - | 23.5 | - | 21.0 | 10.6 |
| 11/7 | - | 23.0 | - | 21.0 | 10.6 |
| 11/14 | - | 23.0 | - | 21.0 | 10.9 |
| 11/28 | - | 23.0 | - | 21.0 | 10.9 |

FIG. 13

| Date | 18-11 | 18-12 | 18-15 | 18-16 | Sample 18-18 |
|---|---|---|---|---|---|
| 4/24 | 0.04 | 0.03 | 0.02 | 0.03 | 0.03 |
| 4/27 | 0.60 | 0.24 | 0.43 | 0.22 | 0.03 |
| 5/1 | 0.45 | 0.24 | 0.42 | 0.22 | 0.04 |
| 5/4 | 0.45 | 0.23 | 0.41 | 0.21 | 0.03 |
| 5/9 | 0.45 | 0.23 | 0.40 | 0.20 | 0.04 |
| 5/11 | 0.45 | 0.23 | 0.40 | 0.20 | 0.05 |
| 5/16 | 0.43 | 0.21 | 0.39 | 0.19 | 0.04 |
| 5/19 | 0.43 | 0.64 | 0.38 | 0.58 | 0.20 |
| 5/23 | 0.43 | 0.60 | 0.38 | 0.55 | 0.20 |
| 5/25 | 0.42 | 0.58 | 0.38 | 0.52 | 0.21 |
| 5/30 | 0.42 | 0.57 | 0.37 | 0.49 | 0.20 |
| 6/1 | 0.41 | 0.57 | 0.37 | 0.48 | 0.20 |
| 6/6 | - | 0.56 | - | 0.46 | 0.20 |
| 6/8 | - | - | - | 0.44 | 0.21 |
| 6/12 | - | 0.80 | - | 0.41 | 0.20 |
| 6/14 | - | 0.78 | - | 0.41 | 0.38 |
| 6/20 | - | 0.80 | - | 0.42 | 0.24 |
| 6/26 | - | 0.76 | - | 0.39 | 0.21 |
| 6/28 | - | 0.75 | - | 0.39 | 0.21 |
| 7/3 | - | 0.94 | - | 0.49 | 0.26 |
| 7/7 | - | 1.03 | - | 0.54 | 0.31 |
| 7/10 | - | 1.01 | - | 0.53 | 0.31 |
| 7/13 | - | 1.01 | - | 0.52 | 0.31 |
| 7/19 | - | 1.00 | - | 0.51 | 0.32 |
| 7/24 | - | 0.99 | - | 0.50 | 0.31 |
| 7/27 | - | 0.98 | - | 0.49 | 0.31 |
| 8/2 | - | 0.98 | - | 0.49 | 0.32 |
| 8/7 | - | 0.97 | - | 0.48 | 0.32 |
| 8/14 | - | 0.97 | - | 0.48 | 0.32 |
| 8/17 | - | 0.96 | - | 0.47 | 0.32 |
| 8/21 | - | 0.95 | - | 0.47 | 0.32 |
| 8/24 | - | 0.95 | - | 0.46 | 0.32 |
| 8/28 | - | 0.94 | - | 0.46 | 0.32 |
| 8/31 | - | 0.94 | - | 0.45 | 0.31 |
| 9/5 | - | 0.94 | - | 0.45 | 0.32 |
| 9/7 | - | 0.93 | - | 0.44 | 0.32 |
| 9/11 | - | 0.92 | - | 0.44 | 0.32 |
| 9/14 | - | 0.92 | - | 0.43 | 0.32 |
| 9/18 | - | 0.91 | - | 0.43 | 0.32 |
| 9/21 | - | 0.91 | - | 0.42 | 0.32 |
| 9/25 | - | 0.90 | - | 0.42 | 0.32 |
| 9/28 | - | 0.89 | - | 0.41 | 0.32 |
| 10/2 | - | 0.90 | - | 0.41 | 0.32 |
| 10/5 | - | 0.92 | - | 0.41 | 0.32 |
| 10/9 | - | 0.92 | - | 0.40 | 0.32 |
| 10/12 | - | 0.92 | - | 0.40 | 0.32 |
| 10/16 | - | 0.91 | - | 0.41 | 0.33 |
| 10/23 | - | 0.91 | - | 0.41 | 0.32 |
| 10/31 | - | 0.90 | - | 0.40 | 0.33 |
| 11/8 | - | 0.90 | - | 0.40 | 0.33 |
| 11/14 | - | 0.88 | - | 0.40 | 0.33 |
| 11/28 | - | - | - | 0.62 | 0.48 |

FIG. 14

| Date | Sample (%) | | | | |
|---|---|---|---|---|---|
| | 18-11 | 18-12 | 18-15 | 18-16 | 18-18 |
| 4/24 | 0.35 | 0.21 | 0.23 | 0.28 | 0.22 |
| 4/27 | 5.61 | 1.93 | 4.54 | 1.94 | 0.23 |
| 5/1 | 4.27 | 1.94 | 4.43 | 1.92 | 0.32 |
| 5/4 | 4.21 | 1.86 | 4.27 | 1.78 | 0.27 |
| 5/9 | 4.19 | 1.82 | 4.21 | 1.72 | 0.30 |
| 5/11 | 4.21 | 1.85 | 4.24 | 1.75 | 0.38 |
| 5/16 | 4.07 | 1.72 | 4.07 | 1.61 | 0.30 |
| 5/19 | 4.02 | 5.20 | 4.01 | 5.03 | 1.65 |
| 5/23 | 4.00 | 4.88 | 3.98 | 4.80 | 1.71 |
| 5/25 | 3.97 | 4.69 | 3.93 | 4.53 | 1.72 |
| 5/30 | 3.91 | 4.60 | 3.90 | 4.25 | 1.70 |
| 6/1 | 3.89 | 4.57 | 3.90 | 4.14 | 1.70 |
| 6/6 | - | 4.50 | - | 4.01 | 1.70 |
| 6/8 | - | - | - | 3.82 | 1.73 |
| 6/12 | - | 6.49 | - | 3.58 | 1.70 |
| 6/14 | - | 6.37 | - | 3.51 | 3.18 |
| 6/20 | - | 6.53 | - | 3.64 | 1.99 |
| 6/26 | - | 6.16 | - | 3.38 | 1.73 |
| 6/28 | - | 6.11 | - | 3.35 | 1.73 |
| 7/3 | - | 7.61 | - | 4.26 | 2.19 |
| 7/7 | - | 8.38 | - | 4.70 | 2.61 |
| 7/10 | - | 8.24 | - | 4.56 | 2.56 |
| 7/13 | - | 8.19 | - | 4.50 | 2.61 |
| 7/19 | - | 8.10 | - | 4.45 | 2.64 |
| 7/24 | - | 8.02 | - | 4.35 | 2.62 |
| 7/27 | - | 7.94 | - | 4.24 | 2.60 |
| 8/2 | - | 7.92 | - | 4.24 | 2.64 |
| 8/7 | - | 7.90 | - | 4.19 | 2.64 |
| 8/14 | - | 7.88 | - | 4.19 | 2.67 |
| 8/17 | - | 7.81 | - | 4.09 | 2.64 |
| 8/21 | - | 7.75 | - | 4.08 | 2.66 |
| 8/24 | - | 7.70 | - | 3.99 | 2.67 |
| 8/28 | - | 7.65 | - | 3.95 | 2.64 |
| 8/31 | - | 7.60 | - | 3.88 | 2.63 |
| 9/5 | - | 7.60 | - | 3.89 | 2.68 |
| 9/7 | - | 7.54 | - | 3.84 | 2.67 |
| 9/11 | - | 7.49 | - | 3.81 | 2.69 |
| 9/14 | - | 7.44 | - | 3.72 | 2.66 |
| 9/18 | - | 7.40 | - | 3.68 | 2.67 |
| 9/21 | - | 7.36 | - | 3.66 | 2.68 |
| 9/25 | - | 7.32 | - | 3.61 | 2.66 |
| 9/28 | - | 7.26 | - | 3.57 | 2.68 |
| 10/2 | - | 7.33 | - | 3.52 | 2.65 |
| 10/5 | - | 7.48 | - | 3.54 | 2.71 |
| 10/9 | - | 7.44 | - | 3.50 | 2.68 |
| 10/12 | - | 7.44 | - | 3.48 | 2.69 |
| 10/16 | - | 7.41 | - | 3.53 | 2.74 |
| 10/23 | - | 7.40 | - | 3.51 | 2.71 |
| 10/31 | - | 7.34 | - | 3.48 | 2.73 |
| 11/7 | - | 7.34 | - | 3.44 | 2.73 |
| 11/14 | - | 7.16 | - | 3.46 | 2.79 |
| 11/28 | - | - | - | 5.37 | 4.02 |

MONOLITHIC COMPOSITION HAVING THE CAPABILITY OF MAINTAINING CONSTANT RELATIVE HUMIDITY IN A PACKAGE

RELATED APPLICATION

This application is a provisional application of U.S. Ser. No. 60/193,085, filed Mar. 30, 2000, which in turn is a continuation-in-part of U.S. application Ser. No. 09/087, 830, filed May 29, 1998, now U.S. Pat. No. 6,124,006, which in turn is a continuation-in-part of U.S. application Ser. No. 08/812,315, filed Mar. 5, 1997, now U.S. Pat. No. 6,130,263, which in turn is a continuation-in-part of U.S. application Ser. No. 08/611,298, filed on Mar. 5, 1996, now U.S. Pat. No. 5,911,937, which in turn is a continuation-in-part of U.S. application Ser. No. 08/424,996, filed Apr. 19, 1995 now abandoned.

FIELD OF THE INVENTION

This invention generally relates to a monolithic composition comprising a water-insoluble polymer and a deliquescent material. In one embodiment, the present invention relates to a polymer blended with one or more deliquescent materials to form a deliquescent material entrained polymer. In another embodiment, the monolithic composition comprises a water-insoluble polymer, a hydrophilic agent and a deliquescent material. The monolithic composition has co-continuous interconnecting channel morphology comprising three components—component A (i.e. water-insoluble polymer), component B (i.e. hydrophilic agent) and component C (i.e. deliquescent material and super-absorbent) wherein the channels consist mainly of component B and the majority of component C. Components A and B are generally immiscible within each other. In addition, one criteria for selecting component C and components A and B may be based on component C preferential affinity for component B over component A. Another criteria for selecting component C is based on the type of deliquescent and super-absorbent material. The invention further relates to an entrained polymer that includes means by which the deliquescent material located within interior portions of the polymer structure are exposed to conditions that are exterior to the polymer body. In one embodiment, the entrained polymer of the present invention is useful in the manufacture of containers and packaging for maintaining a substantially constant relative humidity in the package or container.

BACKGROUND OF THE INVENTION

There are many items that are preferably stored, shipped and/or utilized in an environment that must be controlled and/or regulated. For example, in the moisture control area, containers and/or packages having the ability to absorb excess moisture trapped therein have been recognized as desirable. One application in which moisture absorbing containers are desired is for the shipment and storage of medications whose efficacy is compromised by moisture. The initial placement of medicines into a sealed moisture free container is usually controllable. Furthermore, the container for the medicine is selected so that it has a low permeability to moisture. Therefore, the medication will normally be protected from moisture until it reaches the end user. Once the medicine is received by the customer, however, the container must be repeatedly opened and closed to access the medication. Each time the container is opened and unsealed, moisture bearing air will most likely be introduced into the container and sealed therein upon closure. Unless this moisture is controlled from the atmosphere or head space of the container, it may be detrimentally absorbed by the medication. For this reason, a desiccating unit (e.g. a sachet) is conventionally added together with the medication in the container.

Other items such as electronic components may require reduced moisture conditions for optimal performance. These components maybe sealed in containers, but excess moisture that is initially trapped therein must be removed. Furthermore, the housings may not be completely moisture tight, and moisture may be allowed to seep into the container. This moisture must also be retained away from the working components. For these reasons, it is important to include a desiccating agent within the housing for absorbing and retaining excess moisture. Because of the delicacy of many of the components that are to be protected from the moisture, it is important that the desiccant used not be of a "dusting" nature that may contaminate and compromise the performance of the components. Therefore, it has been recognized as advantageous to expose a desiccating agent to the interior space of such containers, while at the same time shielding the working components from actual contact with the desiccating material, including desiccant dust that may be produced therefrom.

In other instances, moisture may be released from items that have been placed in containers or sealed in packaging such as packaging wrap for shipping and/or storage. Prime examples of such items are food stuffs-that release moisture during shipping and storage. In the instance of containers that are sealed and substantially impermeable to moisture, the released moisture will remain within the container. If not controlled, this released moisture may have detrimental effects on the very item that released the moisture. It has been found that a substantial amount of moisture is released from certain food products within the first forty-eight (48) hours after manufacture and packaging. This released moisture will remain until removed or controlled. If the moisture is not controlled shortly after its release, it may cause the food to degrade into a condition that is not saleable.

SUMMARY OF THE INVENTION

The present invention discloses both a structure and a method by which a monolithic polymer is produced that is capable of maintaining a substantially constant relative humidity in a package. In one embodiment, interconnecting channels are established throughout the composition. These interconnecting channels communicate the entrained deliquescent material to the appropriate areas of the exterior of the composition in a manner that permits the desired property (e.g., moisture) to migrate from outside the shaped article to interior locations where the deliquescent material is positioned. Furthermore, in one embodiment, these interconnecting channels through which the desired property is permitted to travel are occupied by hydrophilic agents (e.g., channeling agents) that control the transmission rate into the composition. The hydrophilic agents are used as bridges from the surface of the composition inwardly to the deliquescent material positioned within the composition.

BRIEF DESCRIPTION OF DRAWINGS

FIGS. 10 through 14 are tables further detailing Example 2.

Figure 1:
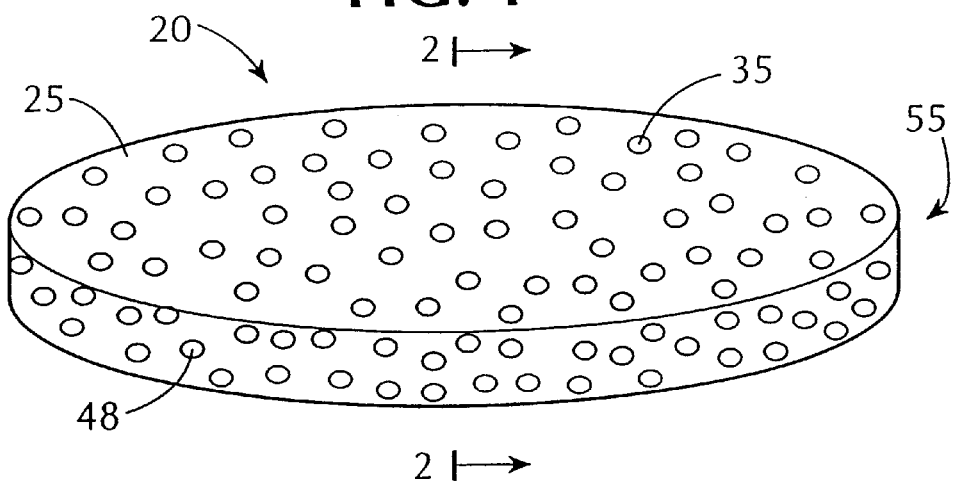
FIG. 1 is one embodiment of the present invention showing a perspective view of a plug, insert, or tablet constructed from the composition of the present invention having, in an exaggerated scale, the openings of the interconnecting channels at the exterior surface of the plug.

Among those benefits and improvements that have been disclosed, other objects and advantages of this invention will become apparent from the following description taken in conjunction with the accompanying drawings. The drawings constitute a part of this specification and include exemplary embodiments of the present invention and illustrate various objects and features thereof.

DETAILED DESCRIPTION OF THE INVENTION

As required, detailed embodiments of the present invention are disclosed herein; however, it is to be understood that the disclosed embodiments are merely exemplary of the invention that may be embodied in various forms. The figures are not necessarily to scale, some features may be exaggerated to show details of particular components. Therefore, specific structural and functional details disclosed herein are not to be interpreted as limiting, but merely as a basis for the claims and as a representative basis for teaching one skilled in the art to employ the present invention.

It has been discovered that deliquescent material may be blended into a polymer to form a polymer composition that is capable of substantially maintaining a desired constant relative humidity in the inside environment of a closed package. For example, by using potassium acetate as a deliquescent, the inside environment of the closed package containing the composition of the present invention may be controlled to about 18 to about 24% RH at about 22° C. Moreover, a super-absorbent material is used in conjunction with the deliquescent to absorb the deliquescent liquid solution.

In one embodiment, the water-insoluble polymer maybe selected from the group of polymers having a sufficiently high moisture vapor transmission that do not significantly inhibit the exchange of water vapor from the environment to the deliquescent material within the polymer. An example would be a high moisture vapor transmission polyurethane.

In yet another embodiment, the composition of the present invention has co-continuous interconnecting channel morphology that may be used in the formation of shaped articles such as containers, sheets, films, pellets, beads and discs. Specifically, a composition having co-continuous interconnecting channel morphology may be formed comprising at least three components, wherein: (a) component A is selected from the group of polymers that are semicrystalline polymers and amorphous polymers; (b) component B is a polymer; (c) components A and B are immiscible within each other; (d) component C is a deliquescent and super-absorbent particle; (e) the volume fraction of component A represents at least about 50% by volume of the total volume of components A, B and C; (f) the preferential affinity between component B and component C is greater than between component A and component C; (g) at least two phases are formed, one phase is composed of a majority of component A, and the second phase is composed of a majority of components B and a majority of component C; and (h) two phases form the co-continuous interconnecting channel morphology.

Components A, B and C may be selected based on the desired end-use result—the desired end-use property. For example, component A may typically be selected based on its permeability properties (e.g. barrier properties), its chemical and/or temperature resistance properties, its molding properties, and/or its price (e.g. since it is the component having the largest volume fraction of the composition). Similarly, for example, component B may typically be selected based on its transport properties of moisture vapor and its preferential affinity with component C. In one embodiment, for moisture vapor transmission, component B may be a hydrophilic agent. Also, for example, component C may be selected as the desired deliquescent to provide the desired controlled relative humidity environment. Consequently, a specific composition maybe uniquely tailored and thus, uniquely optimized for a desired end-use application.

One method of forming the composition of the present invention is, for example, by adding component C and component B to component A, when component A is in a molten state; or before component A is in the molten state, so that components B and C may be blended and thoroughly mixed throughout component A to insure that the blend is uniformly mixed before reaching the melt phase. For example, such a technique may be useful when components A, B and C are all powders. In another embodiment, component B (such as a hydrophilic agent) and component A are mixed prior to adding component C. Component B is either added before component A is in the molten state or after component A is in the molten state. For example, component C may be added to component A during the thermal process of forming sheets. After blending and processing, component B is drawn out into interconnecting channels that contain a percolation path in component A. The majority of component C resides in the interconnecting channels because of its preferential affinity towards component B over component A. In addition, the composition of the present invention maybe described as "monolithic" because the resulting composition does not consist of two or more discrete macroscopic layers.

For purposes of the present invention, the term "phase" means a portion of a physical system that is uniform throughout, has defined boundaries and, in principle, can be separated physically from other phases. The term "water-insoluble polymer" means a polymer having a solubility in water below about 0.1% at 25° C. and atmospheric pressure. The term "hydrophilic agent" is defined as a material that is not cross-linked and that has a solubility in water of at least about 1% at 25° C. and atmospheric pressure. Suitable hydrophilic agents include "channeling" agents. The term "melting point" is defined as the first order transition point of the material determined by DSC. The term "not mutually soluble" means immiscible with each other. The term "immiscibility" means that the components of the blend are driven by thermodynamic forces to separate (i.e. demix) into two or more distinct phases that will coexist indefinitely under equilibrium conditions. An example is the separation of the oil-rich and water-rich phases in a salad dressing. For purposes of the present invention, "partial" immiscibility or "partial" miscibility is deemed "immiscible" and thus, any tendency for a component to phase separate from another component is deemed "immiscible." Immiscibility may be determined by the application of one or more forms of microscopy (e.g., optical, TEM, SEM or AFM) with an observation that the components are separated into two or more distinct phases. The term "particle" means a dispersed component that is either a crystalline or amorphous solid, or a crosslinked organic or inorganic material, and that retains its shape, aside from recoverable deformations, before, during, and after the blend is compounded in the molten state at elevated temperatures. This would include, e.g., a crosslinked polymer latex.

Further, for purposes of the present invention, the term "co-continuous interconnecting channel morphology" means that the minor phase (i.e., component B) is drawn out into interconnected channels that contain a percolation path, while simultaneously, the majority phase (i.e., component A) is percolating. "Percolation" means that there exists at least one unbroken path, composed only of points from within that phase, that will lead from any surface of a sample through the interior of the sample to any other surface. Such a percolation path provides a route for a desired object, such as a small molecule, an atom, an ion, or an electron, to be macroscopically transported across the sample while contacting only one of the phases. For some systems, the existence of an interconnecting channel morphology that is co-continuous may be determined by a minimum of two transport measurements that demonstrate percolation in both minor and major phases. Percolation theory is a mature branch of mathematics and physical science that is described in a variety of review articles, specialized monographs, and many introductory texts on stochastic processes, probability theory, and statistical mechanics. For example, an introductory treatment of percolation theory is described by D. Stauffer in *Introduction to Percolation Theory*, Taylor and Francis, (London 1985).

The term "preferential affinity" means that the particle (i.e., component C) has a lower interfacial energy when contacting one component than compared to contacting another component. A suitable method for determining "preferential affinity" for the present invention is the following:

(a) Blend the particle with the two components at elevated temperatures in their liquid state. Mix to achieve a macroscopically homogeneous dispersion.

(b) Cool the mixture and allow to solidify.

(c) Use a form of microscopy (e.g., TEM, SEM, and/or AFM) on a thin section to determine which of the two phases most closely contacts each particle in the field of view.

(d) The component that is in the majority in the phase that contacts the largest number of particles is the component with "preferential affinity" for the particle.

Further, the term "polymer" means a composition that is made by reacting two or more molecular species ("monomers") to form chemically-bonded larger molecules. The term "semicrystalline" means that the polymeric component, at ambient temperature, contains regions in which chain segments are packed with spatial registry into a periodic lattice and these regions are of sufficient size and extent to exhibit a detectable melting endotherm in a differential scanning calorimetry (DSC) measurement. The term "amorphous" means that the polymeric component, at ambient temperature, either contains no regions of periodic packing of segments, or such regions are undetectable with a DSC measurement.

The term "deliquescent" means a material that is initially solid and that is capable of absorbing atmospheric water vapor. As a consequence of absorbing water vapor, the deliquescent material gradually dissolves into a saturated solution. Suitable deliquescent material include, but are not limited to, alkali metal halides, alkaline earth metal halides, iron halides, aluminum halides and combinations thereof. Specifically, suitable deliquescent material includes, but are not limited to, potassium acetate, copper sulfate, sodium sulfate, calcium chloride, lithium chloride, sodium hydroxide and magnesium chloride.

The term "super-absorbent" means a material that is capable of absorbing the saturated solution of the deliquescent. Suitable super-absorbents include, but are not limited to, super-absorbent polymers of the type such as "Carbopol" (i.e. high molecular weight homopolymers or copolymers of acrylic acid crosslinked with a polyalkenyl polyether) from B. F. Goodrich; polyacrylic acid salt; "SAB 800" from Stockhausen, Greensboro N.C.; "SANWET IM 1000" from Hoeschst Celanere Corp; "ARIDAL 1460" from Chendal Corp; and "ARASORB 800F" from Arakawa Chemical Industries. Typically these sodium polyacrylate/polyalcohol polymers and copolymer sorbents are manufactured and sold as free-flowing, discrete particles, in powder or granular form. Other suitable super-absorbents may include polyethylene oxide, sodium carbomethyl cellulose and like polymers. The selection of the "super-absorbent" material must be a material that does not swell to the degree that the super-absorbent damages the structure of the final shaped article.

In one embodiment, suitable hydrophilic agents of the present invention include polyglycols such as poly(ethylene glycol) and poly(propylene glycol) and mixtures thereof. Other suitable materials include EVOH, glycerin, pentaerithritol, PVOH, polyvinylpyrollidine, vinylpyrollidone or poly(N-methyl pyrollidone), and saccharide based compounds such as glucose, fructose, and their alcohols, mannitol, dextrin and hydrolyzed starch being suitable for the purposes of the present invention since they are hydrophilic compounds.

In another embodiment, suitable hydrophilic agents of the present invention may also include any hydrophilic material wherein, during processing, the hydrophilic agent is heated above its melt point upon melt mixing, and subsequently upon cooling separates from the polymer to form the interconnecting channeled structure of the present invention and a three phase system of a water-insoluble polymer, hydrophilic agent and a deliquescent material.

As the concentration of component C in the mixture is increased, the greater the absorption capacity will be of the final composition. However, the higher concentration of this combination may cause the shaped article to be more brittle and the mixture to be more difficult to either thermally form, extrude or injection mold. For that reason, it is believed that a maximum load of the deliquescent and super-absorbent combination of approximately ninety percent by weight with respect to the water-insoluble polymer is obtainable. In another embodiment, this combination loading level can range from about 10% to 20%, 20% to 40%, 40% to 60%, 60% to 75%, and 75% to 90% by weight with respect to the polymer.

Specifically, in one embodiment, the loading level of the deliquescent material can range from about 5% to 10%, 10% to 20%, 20% to 30% and 30% to 40% by weight. The specific loading level of the total composition of the deliquescent material is selected to achieve the desired result—to maintain a substantially constant relative humidity in the closed container for a specified time period. Consequently, the loading level of the deliquescent material may be selected based on one or more of the following parameters including: (a) the volume of the interior of the container (i.e. the total volume that required the controlled environment); (b) the exposed surface area of the shaped article of the monolithic composition of the present invention; (c) the degree of impermeability of the barrier material of the container; (d) the hypothetical number of times the container will be opened and closed (i.e. the overall amount of time the interior of the container will be exposed to the outside environment); (e) the typical temperature and relative humidity conditions of the outside environment; and (g) the residual moisture, if any, of the product(s) filled in the container. Moreover, the specific deliquescent material is selected based on the constant relative humidity that is required to be maintained in the interior of the container. For example, to maintain a substantially constant relative humidity in the range of about 18 to about 22%, potassium acetate may be chosen as the deliquescent. For other relative humidities, standard tables may be consulted to select the proper deliquescent material. For example, *Langes Handbook Of Engineering* discloses tables for deliquescent material and their corresponding constant humidity. As can be seen from these tables, another variable that determines the potential constant relative humidity of the specific deliquescent material is the specific hydrate level of the material. Since many deliquescent materials have varying hydrate levels and a corresponding constant relative humidity for each hydrate level, one embodiment of the present invention involves pre-loading the deliquescent with a specific hydrate level prior to inserting in the package. Thus, the interior of the package may be maintained at a predetermined substantially constant relative humidity. It is understood that the term "substantially constant relative humidity" means a range of relative humidities that are within the acceptable range for the specific application. For example, some medications that have a gelatin coating (e.g. "Gel-caps") will be detrimentally affected if a desiccant is used because desiccants typically absorb all the moisture in a package and thus, may over-dry the gel-caps. In these applications, maintaining a constant relative humidity within an acceptable range that does not over-dry the material is the only criteria. For example, a "substantially constant relative humidity" may be a relative humidity range including, but not limited to, the following: (a) between about 5% and about 10%; (b) between about 5% and about 15%; (c) between about 10% and about 20%; (d) between about 15% and 25%; (e) between about 20% and 35%; and (f) between about 25% and 40%.

In one embodiment, the water-insoluble polymer of the present invention may be any thermoplastic material. Examples of suitable thermoplastic materials include polyolefins such as polypropylene and polyethylene, polyisoprene, polybutadiene, polybutene, polysiloyane, polycarbonates, polyamides, ethylene-vinyl acetate copolymers, ethylene-methacrylate copolymer, poly(vinyl chloride), polystyrene, polyesters, polyanhydrides, polyacrylonitrile, polysulfones, polyacrylic ester, acrylic, polyurethane and polyacetal, or copolymers or mixtures thereof.

With respect to the combination of the deliquescent material and the super-absorbent material, the specific deliquescent material is first chosen based on the constant relative humidity that is desired to be maintained. Then, the loading level of the deliquescent material is chosen based on the above discussion of parameters. Other variables that may affect the constant relative humidity conditions include: (a) the type and loading level of the channeling agent; (b) the size of the particle of the deliquescent and super-absorbent; (c) the purity of the deliquescent; and (d) the type and loading level of the super-absorbent.

After the deliquescent material and loading level is determined, the specific super-absorbent material and loading level of the super-absorbent material are selected by, first, determining the maximum amount of saturated solution that results from the dissolving of the deliquescent material (i.e. specific deliquescent material and the loading level) as result of the deliquescent material absorbing atmospheric water vapor in the specific application. Based on this determination, liquid absorption data of super-absorbents may be obtained from the manufacturer of the super-absorbent and/or may be derived from experimental data. Since different super-absorbents have different overall capacities to absorb liquid solutions and different rates of uptake of liquid solution, the specific super-absorbent should be chosen to obtain the desired result—complete absorption of the liquid solution and the appropriate absorption rate for the specific application.

In one embodiment, the composition of the present invention includes: (1) a polymer having a sufficiently high moisture vapor transmission rate that does not significantly inhibit the exchange of water vapor from the interior of the container to the deliquescent material within the polymer; (2) a deliquescent material, which is selected to maintain a substantially constant relative humidity within the interior of the container; and (3) a super-absorbent material, which is selected to absorb the liquid solution of the deliquescent material.

In yet another embodiment, if a super-absorbent material is used that is an acid, another material may be added to neutralized the acid. For example, when "Carbopol" (i.e. an acid) is used in conjunction with a deliquescent material such as potassium acetate, a sufficient amount of additional potassium (for example, in the form of potassium hydroxide) may be added to neutralized the "Carbopol" to minimize the production of acetic acid (e.g. an undesirable odor).

In another embodiment where the composition of the present invention has a co-continuous interconnecting channel morphology, component B maybe a hydrophilic agent. Suitable hydrophilic agents of the present invention may include polyglycols such as poly(ethylene glycol) and poly (propylene glycol) and mixtures thereof. Other suitable materials may include EVOH, pentaerithritol, PVOH, polyvinylpyrollidine, vinylpyrollidone or poly(N-methyl pyrollidone), and saccharide based compounds such as glucose, fructose, and their alcohols, mannitol, dextrin, and hydrolized starch being suitable for the purposes of the present invention since they are hydrophilic compounds.

In another embodiment, suitable hydrophilic agents of the present invention may also include any hydrophilic material wherein, during processing, the hydrophilic agent is heated above its melt point upon melt mixing, and subsequently upon cooling separates from the polymer to form the interconnecting channeled structure of the present invention and a three phase system of a water-insoluble polymer, hydrophilic agent and an absorbing materials.

In one embodiment, the particle (i.e. component C) may be composed of the deliquescent material and/or the combination of the deliquescent and super-absorbent materials.

In yet another embodiment, the components maybe first dry mixed in a mixer such as a Henschel, and then fed to a compounder. A Leistritz twin screw extruder, for example, or a Werner Pfleider mixer can be used to achieve a good melt mix at about 140° C. to about 170° C. The melt can then be either extruded to form, for example, a film or other shaped article or converted into pellets using dry air cooling on a vibrating conveyer. The formed pellets, containing channels, can, for example, then be either injection molded into other shaped articles such as beads, sieves, or co-injected with polypropylene as the inside layer of a container.

In yet a further another embodiment, because the composition of the present invention may typically be more brittle than the polymer without the components B or C, the package may be molded so that an interior portion of the package is the composition of the present invention while the exterior portions are formed from pure polymer. For example, a package having an interior portion composed of the composition of the present invention and an exterior portion composed of pure polymer typically will not only be more durable and less brittle, but it will also act as a moisture barrier that resists the transmission of moisture from the exterior into the interior of the package.

The composition of the present invention has numerous applications. One application is the construction of rigid containers that are suitable for containing relatively small volumes of product such as food stuffs and medicines. In many cases, these types of products must be shipped and stored in substantially controlled relative humidity environments. In another embodiment, the composition of the present invention may be formed into an insert for inclusion within the interior of the container. An example of one form of an insert is a plug of any suitable shape. While the plug would serve its purpose by being merely deposited within the container, it may also be fixed to an interior location so that it does move about within the interior space. In a further embodiment, it is anticipated that a plug formed into a disc may be shaped and sized to be pressed fit into the bottom of a polymer formed container.

In another embodiment, a liner maybe formed from the composition of the present invention that has an exterior surface substantially conforming to an interior surface of the container body. Like the disc, the liner maybe sized so that it maybe press-fit into position within the polymer body where it is held sufficiently snugly to prevent its unintended disengagement therefrom. Alternatively, in a further embodiment, either the plug or liner may be initially constructed and allowed to harden, and then the container body subsequently constructed thereabout so that the greater shrinkage characteristics of the pure polymer body tightly shrink-fits the container body about the plug or liner so that neither becomes easily disengaged from the other. In still a further embodiment, the insert taking the form of either a plug or a liner maybe substantially simultaneously comolded with the polymer container body so that each is integrally joined with the other. In the event of a co-molding process, the viscosities of the insert having the composition of the present invention and the polymer container body should typically be approximately equal to facilitate the proper and desired location of the two phases of liquid or molten material that are molded together.

In yet another embodiment, composition of the present invention may be used to form sheeting either alone or that maybe joined with another sheet. In at least one embodiment, the sheets are effectively laminated one to the other so that an exterior layer may be established adjacent to the composition of the present invention which is substantially air and moisture impermeable. The laminate sheet may then be used to wrap an item which is to be stored in a controlled environment. One means by which the joinder process may be accomplished is through a thermal extrusion procedure.

In one embodiment of the present invention described herein, advantages and enhancements over the prior art methods and structures stem from the discovery of the ability to create interconnecting channels throughout the composition of the present invention so that a rigid body may be constructed from the composition of the present invention while also exposing the deliquescent material to the environment. Furthermore, the discovery of employing a hydrophilic agent that also acts as a transmission rate bridge between the exterior of the polymer body and the interiorly located deliquescent material greatly enhances the structures' ability to quickly remove the desired property (e.g., moisture) located exteriorly the entrained structure, while at the same time taking advantage of a greater portion of the water-absorbing material's capacities.

One embodiment of the present invention includes a process for producing the composition of the present invention. In one embodiment, the process comprises blending a water-insoluble polymer (i.e. component A) and a hydrophilic agent (i.e. component B). Either prior to or at the time of blending the hydrophilic agent or afterblending the hydrophilic agent, the particle (i.e. deliquescent and super-absorbent material(s)) is blended into the polymer so that the additive is uniformly distributed within the polymer and the hydrophilic agent is distributed within the polymer. Subsequently, after the composition is solidified, the result is that the hydrophilic agent forms interconnecting channels in the composition through which the desired property is transmitted through the polymer to the deliquescent material within the composition. In another embodiment, component A, the hydrophilic agent (i.e. component B) and deliquescent material (e.g. component C) are all thoroughly mixed in dry powder form, and then the polymer blend is melted and formed into a desired shape by molding. Interconnecting channels are formed in the composition through which the desired property is transmitted through the polymer to the deliquescent material within the composition.

In one embodiment, the composition of the present invention is used to form a plug for inclusion within a package constructed of a barrier substance. In another, the composition of the present invention is used to form a liner for inclusion within a container constructed from a barrier substance. In still another embodiment, the composition of the present invention is used to form a sheet. The sheet may optionally be combined with a barrier sheet constructed of a barrier substance for use as a packaging wrap. In another embodiment, the composition of the present invention is used to form an insert for a container.

Figure 2:
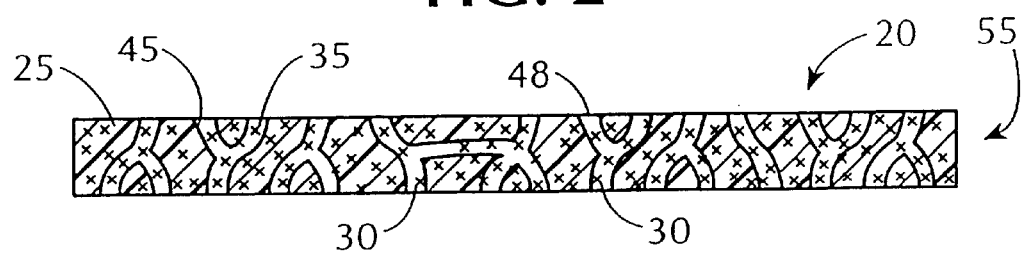
FIG. 2 is one embodiment of the present invention showing an exaggerated, cross-sectional view of a solidified plug formed from a polymer having a hydrophilic agent and a deliquescent material blended therewith.
Figure 5:
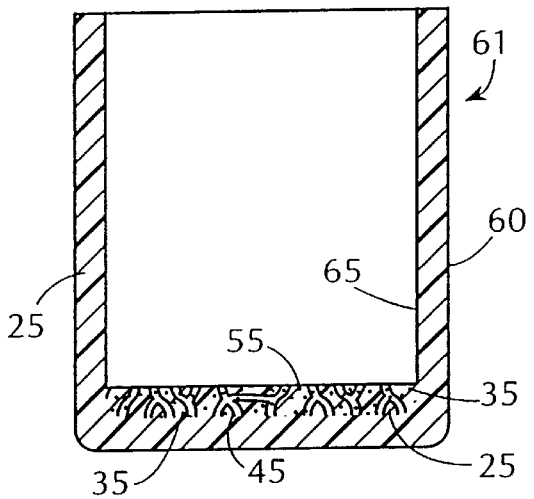
FIG. 5 is one embodiment of the present invention showing an exaggerated cross-sectional view of a portion of a container having the composition of the present invention formed into a liner insert located within the interior of a container constructed from a polymer that acts as a transmission rate barrier.

Referring to FIG. 1 of the accompanying drawings of an embodiment of the present invention, an insert constructed from the composition of the present invention 20 is illustrated. For purposes of this disclosure of the present invention, the words "entrain" and "contain" have been used interchangeably when referring to the inclusion of component C 30 in composition 25. The insert is in the form of a plug 55 that may be deposited into a container body 60 (FIG. 5) thereby establishing a container 61 (FIG. 5). Referring to FIG. 2, a cross-sectional view is shown of the plug 55 that has been constructed from a polymer mixture comprising component A (25) that has been uniformly blended with component C (30) and component B (35). In the illustration of FIG. 2, the composition of the present invention has been solidified so that the co-continuous interconnecting channel morphology 45 have formed throughout the composition to establish passages throughout the solidified plug 55. As maybe appreciated in both FIGS. 1 and 2, the passages terminate in channel openings 48 at an exterior surface of the plug 55.

Figure 3:
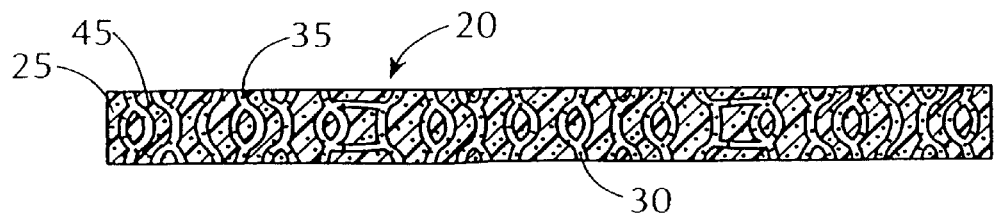
FIG. 3 is one embodiment of the present invention showing an exaggerated cross-sectional view of a portion of a container having the composition of the present invention formed into a plug insert located in the bottom of a container constructed from a polymer that acts as a transmission rate barrier.

FIG. 3 illustrates an embodiment of the present invention of a plug 55 which has been deposited into a container body 60 thereby establishing a container 61 having the desired constant relative humidity properties. The container body 60 has an interior surface 65 and is constructed substantially from the composition of the present invention. In this manner, the transmission property is resisted from being transmitted across a wall of the container 60 when the container 60 is closed. As maybe seen in FIG. 3, the plug 55 has been press fit into a bottom location of the container 60. It is contemplated that the plug 55 may be merely deposited in the container 60 for loose containment therein, but may also be coupled to the body of the container 60 in a manner that fixes the plug 55 to the container 60. The couple between the plug 55 and the container body 60 is intended to prevent the dislocation and relative movement of the plug 55 thereabout. This connection may be accomplished by a snug press fit between the plug 55 and the interior surface 65 of the body 60, or it maybe mechanically connected in such manners as adhesives, prongs, lips or ridges that extend about the plug 55 to hold the plug 55 in place. In yet another embodiment, it is contemplated that the container body 60 maybe molded about the plug 55 so that during the curing process of the container body 60 the body 60 shrinks about the plug 55 thereby causing a shrink-fit to be established between the two components. This type of couplement may also be accomplished in a comolding process or sequential molding process with the same results achieved because the plug 55 will have less shrinkage than the polymer 25 comprised container body 60.

Figure 4:
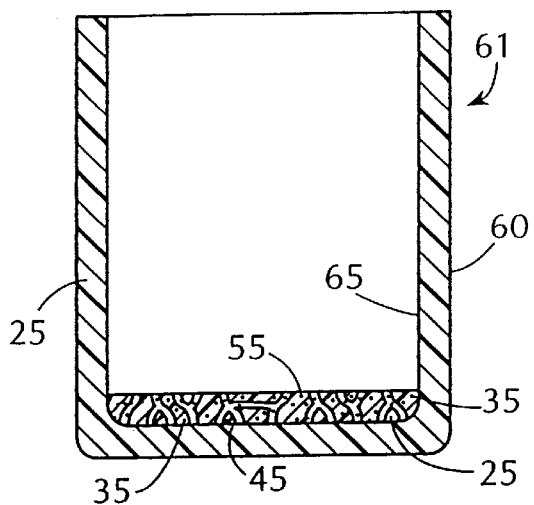
FIG. 4 is one embodiment of the present invention showing an exaggerated cross-sectional view of a portion of a container having the composition of the present invention formed into a plug that has been comolded into the bottom of a container that is constructed from a polymer that acts as a transmission rate barrier.

FIG. 4 illustrates an absorbing container 61 having the composition of the present invention formed of a plug 55 located at a bottom location of the container 60 similar to the configuration illustrated in FIG. 3, but the plug 55 and container body 60 are comolded so that a unified body 61 is formed with a less distinct interface between the plug 55 and body 60 components.

Figure 6:
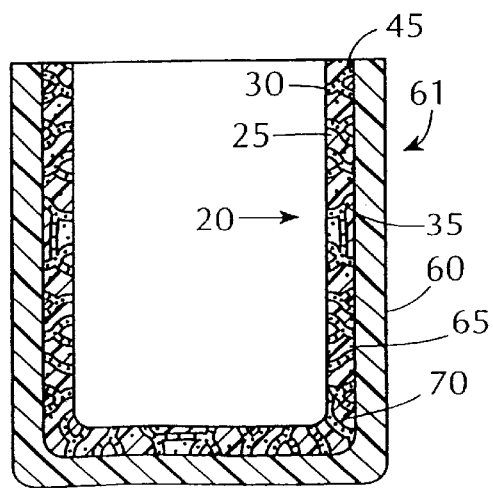
FIG. 6 is one embodiment of the present invention showing an exaggerated cross-sectional view of a portion of a container having the composition of the present invention formed into a liner that has been comolded at the interior of a container that is constructed from a polymer that acts as a transmission rate barrier.

FIGS. 5 and 6 illustrate concepts similar to those of FIGS. 3 and 4, however the proportions of the plug 55 have been extended so that a liner 70 is formed which covers a greater portion of the interior surface 65 of the desiccating container 61. The liner 70 is not localized in the bottom portion of the container body 60, but has walls which extend upwardly and cover portions of the walls of the container 61. Like the plug 55, the liner 70 may be separately molded and subsequently combined with the container body 60 or it may be comolded therewith into the unified body illustrated in FIG. 6.

Figure 7:
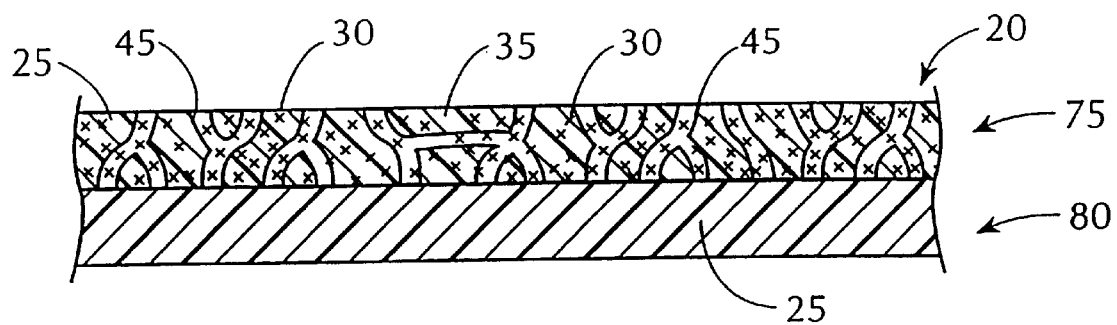
FIG. 7 is one embodiment of the present invention showing an exaggerated cross-sectional view of the composition of the present invention formed into a sheet located adjacent to a barrier sheet constructed from a polymer that acts as a transmission rate barrier.
Figure 8:
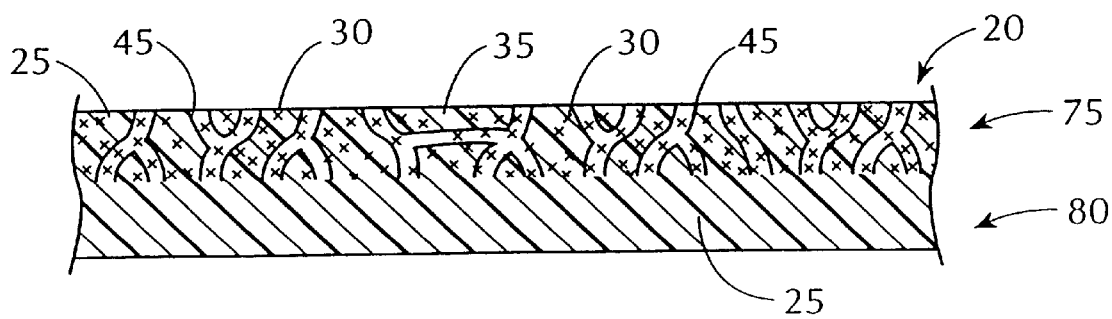
FIG. 8 is one embodiment of the present invention showing an exaggerated cross-sectional view the composition of the present invention formed into a sheet that has been comolded at an interior of a barrier sheet so that the products are integrally molded together and comprise one unified laminate.

FIGS. 7 and 8 illustrate an embodiment of the invention in which a sheet of the present invention 75 is created for combination with a barrier sheet 80. The characteristics of the sheets are similar to those described with respect to the plug 55 and liner 70 and container body 60. That is, FIG. 7 illustrates an embodiment in which the two sheets 75, 80 are separately molded, and later combined to form a packaging wrap having the desired constant relative humidity characteristics at an interior surface and impermeability characteristics at an exterior surface.

FIG. 8 illustrates a comolded process wherein an interface between sheet 75 and the barrier sheet 80 is less distinct than in the embodiment of FIG. 7. This product can be produced by a thermal, forming process. It is contemplated that the separate sheets 75, 80 of FIG. 7 maybe joined together with an adhesive or other suitable means to form a laminate from the plurality of sheets 75, 80. Alternatively, the sheeting 75, 80 may be manufactured from a thermal extrusion process whereby both sheets 75, 80 are manufactured at the same time and effectively comolded together to form the embodiment illustrated in FIG. 8.

In a further embodiment of the present invention, a plug 55 is formed from the mixture for inclusion within a container 60 that is constructed from a barrier substance. In one embodiment, the plug 55 is deposited into a container 60 that is constructed from a barrier substance. In this manner, container 61 of the present invention is created. The plug 55 may be coupled to an interior surface of the container body 60 so that the plug 55 is fixed relative to the container 60.

Alternatively, a container 60 constructed from a barrier substance maybe molded about the plug 55 so that at least a portion of the plug 55 is exposed to an interior of the container 60. Plug 55 made according to the present invention may also be co-molded with a container 60 that is constructed from a barrier substance so that at least a portion of the plug 55 is exposed to an interior of the container 60.

In another embodiment, a liner 70 maybe formed from the mixture 40 and then be included within a container 60 constructed from a barrier substance. The liner 70 typically, but not necessarily, has an exterior surface configured for mating engagement with an interior surface 65 of the container 60. The liner 70 may be pressed into mating engagement with the container 60 so that a container 61 is created wherein at least a majority of the interior surface 65 of the container is covered by the liner 70. The liner 70 may be formed from the mixture 40 and then a container 60 constructed from a barrier substance may be molded about the liner 70 so that at least a portion of the liner 70 is exposed to an interior of the container 60 and a majority of an interior surface 65 of the container 60 is covered by the liner 70.

Alternatively, the liner 70 and container body 60 maybe comolded together into a unified body. The absorbing sheet 75 is combined with a barrier sheet 80 that is constructed of a barrier substance for use as a packaging wrap. The sheets 75, 80 may be laminated by thermal extrusion.

In still another embodiment of the present invention, a method for making a container 61 of the present invention is provided. The method includes forming a container 60 from substantially gas impermeable material so that a gas barrier is created between an interior and exterior of the container. An insert is formed from composition of the present invention. The insert has an exterior surface that is configured for mating engagement with at least a portion of an interior surface 65 of the container 60. The insert is installed into the interior of the container 60 so that at least a portion of the exterior surface of the insert a buttingly engages the interior surface 65 of the container 60. The engagement fixes the insert relative to the container 60 and resists disengagement of the insert from the container 60. The insert is exposed to the interior of the container 60 for absorbing moisture vapor. The insert is pressed into the interior of the container 60 with sufficient force that the insert fits tightly within the container 60 thereby resisting disengagement therefrom. The insert is sized and shaped so that the insert fits snugly into a receiving location within the interior of the container for retention at the receiving location.

In yet another embodiment, a method for making an absorbing container 61 is provided. A container is formed from substantially air and moisture impermeable material so that a barrier is established between an interior and exterior of the container 60. A substantially solid tablet or plug 55 is formed from the composition of the present invention 20, the tablet 55 being suitably sized to fit within the interior of the container 60. The tablet 55 is then deposited into the interior of the container 60 thereby establishing a means for maintaining a substantially constant relative humidity in the interior of the container 60 when the container 60 is closed about the tablet 55.

The present invention will be illustrated in greater detail by the following specific examples. It is understood that these examples are given by way of illustration and are not meant to limit the disclosure or claims. All percentages in the examples or elsewhere in the specification are by weight unless otherwise specified.

EXAMPLE 1

The purpose of the following example is to demonstrate that the composition of the present invention results in a composition that is capable of maintaining a substantially constant relative humidity in a closed container. Although the following example is demonstrated with a composition having the co-continuous interconnecting channel morphology, this example is not meant to limit the present invention to this type of morphology.

The composition was composed of the following (% by weight of total):

Component A: 18% ethylene-olefin copolymer. The manufacturer was Exxon Chemical Co. and the tradename "EXACT 4023."

Component B: 4% polyethylene glycol and 8% polyethylene oxide. The manufacturer of polyethylene glycol was Dow Chemical Co. and the tradename "E-4500." The manufacturer of polyethylene oxide was Union Carbide Corp. and the tradename "POLYOX" WSR 301.

Component C: 50% high molecular weight homopolymers and copolymers of acrylic acid crosslinked with a polyalkenyl polyether. (The manufacturer was B. F. Goodrich and the tradename "CARBOPOL" 971). 10% potassium acetate (i.e. deliquescent). 10% potassium hydroxide.

Components A, B and C were weighed out according to the breakdown listed above. Components B and C were hand mixed for a sufficient time to form a uniform blend. The blended components and component A were fed a Leistriz® twin screw extruder. The extruder operated at the following conditions: the initial temperature was about 55 to 65° C., the temperature ramped to about 120° C. and the final temperature was about 120° C. The extruded material was fed to a three roll calendar stack, which was heated to between about 20 and 45° C. The resulting material was a film of about 6 inches wide and about 0.01275 inches thickness.

The resulting film was tested for its capability to maintain a substantially constant relative humidity in a closed container. Three samples of approximately 10 grams ±2 grams of film were rolled and place in a substantially leakproof, flip-top vial. (The film weight approximated the average weight of a comparable sleeve for the vial). The vial was manufactured by Capitol Vial (mold 216 vial). A relative humidity transducer (capacitive type) was mounted through the bottom of the vial. The vial was closed and placed in an environmental test chamber controlled at 80° RH and 72° F. The relative humidity was recorded inside the vial until a stable relative humidity value was obtained. Over the test period, the vials were regularly opened for a total of eight times so that the air was exchanged between the vial and the environmental chamber. The vial lid was subsequently closed. The relative humidity inside the vial was again monitored.

Figure 9A:
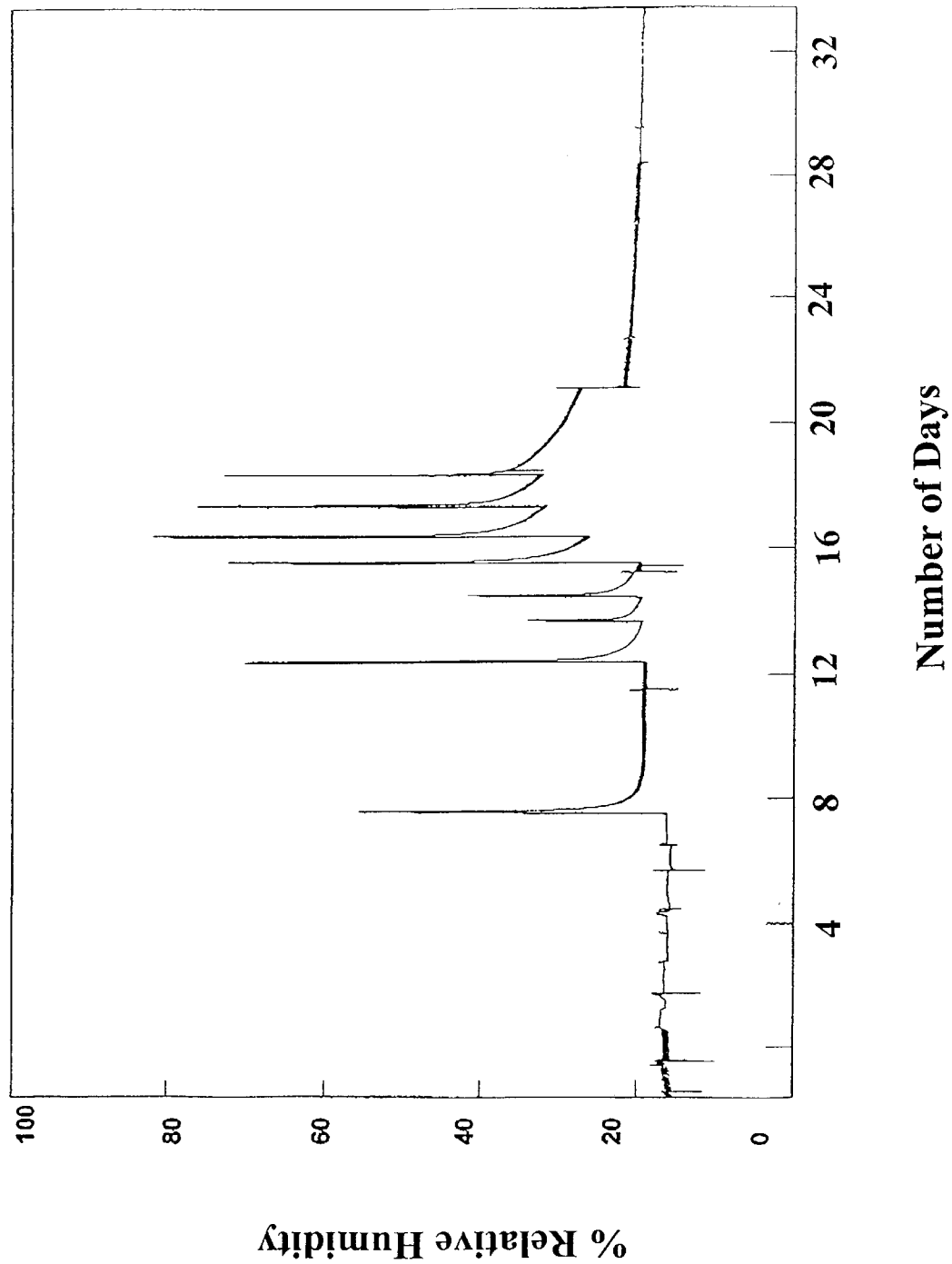
FIGS. 9a, 9b and 9c are a graphical view of the data of the Example of the present invention.
Figure 9B:
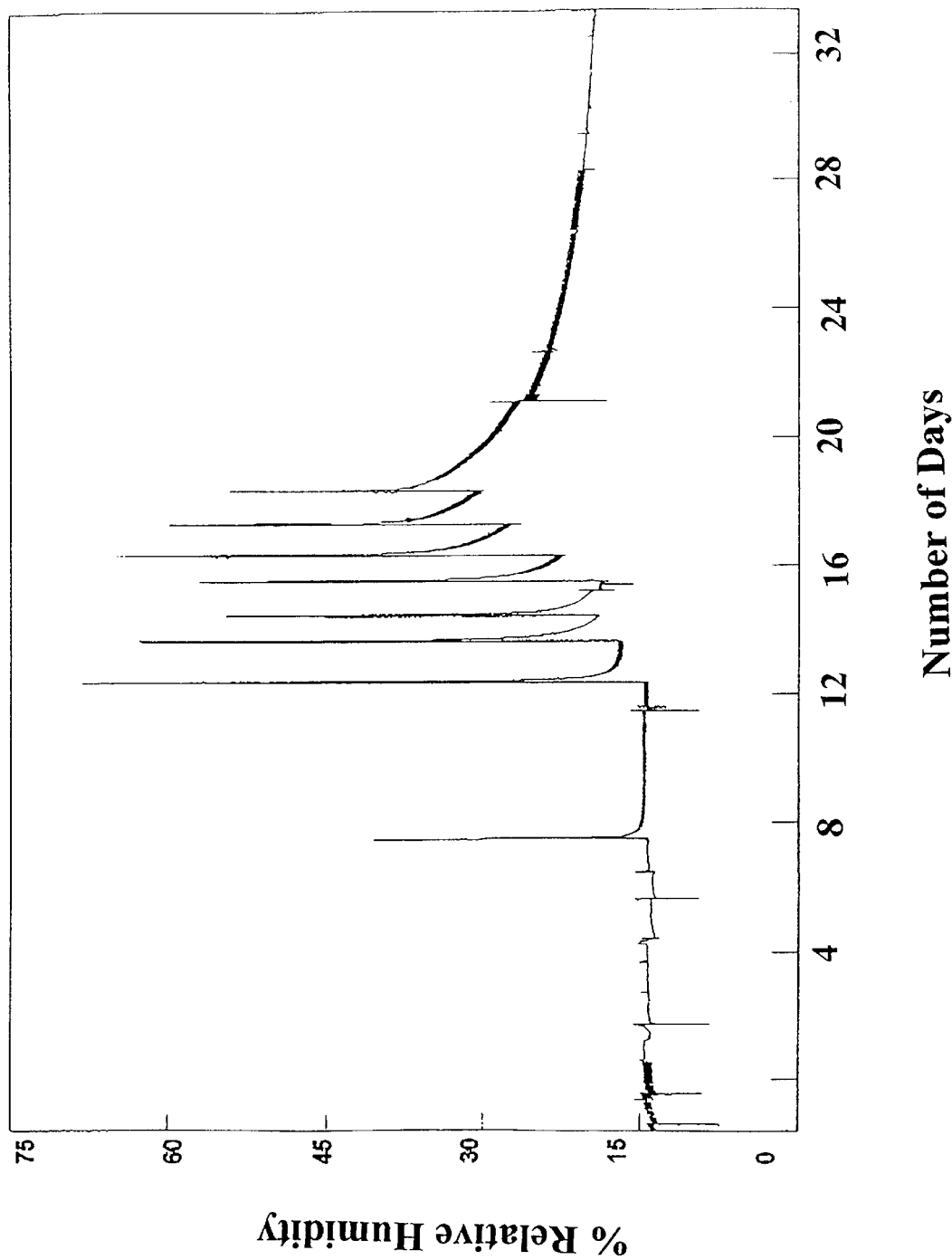
Figure 9C:
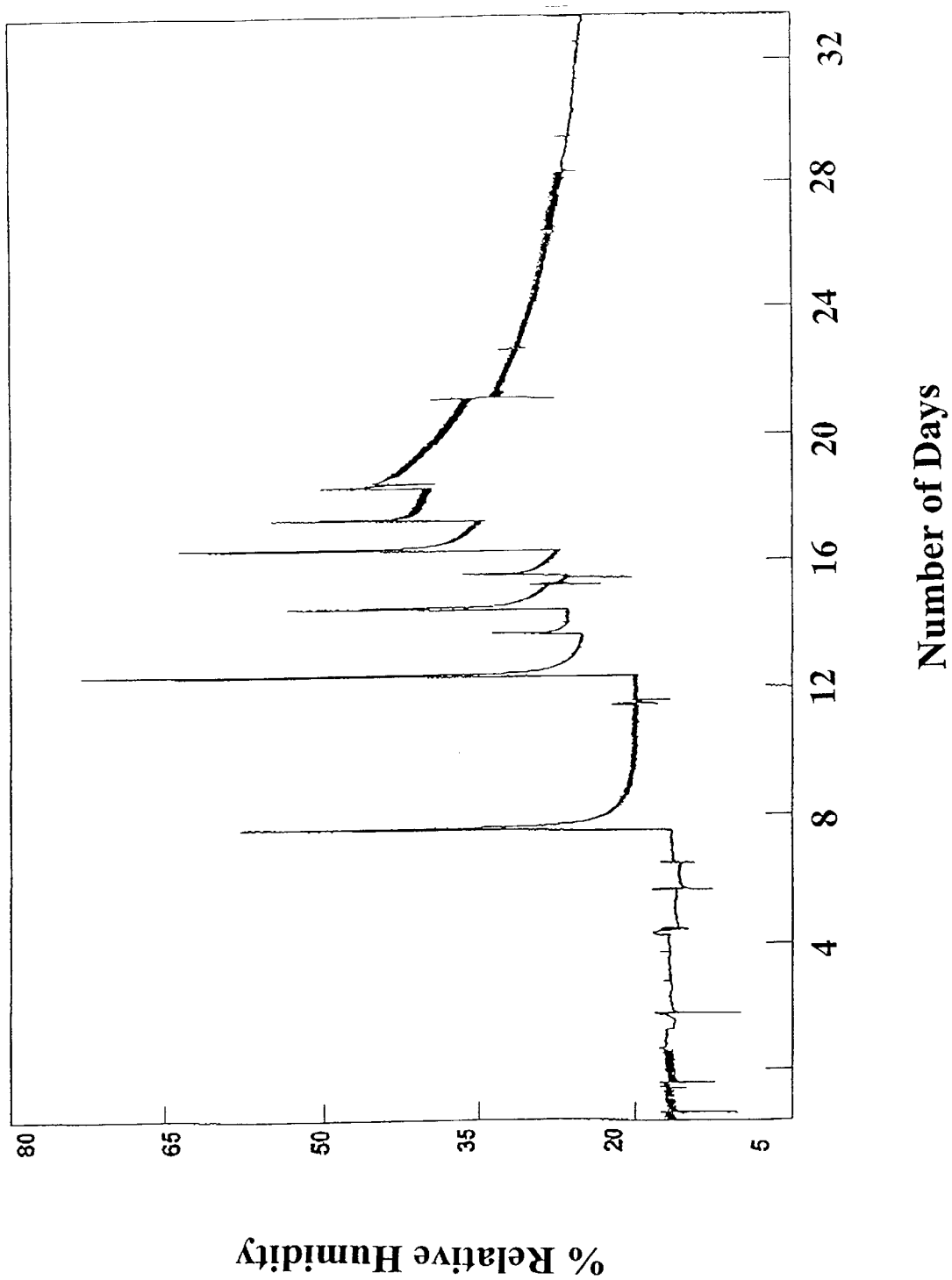

FIGS. 9*a*, 9*b* and 9*c* are three samples of the same composition described above. As FIGS. 9*a*, 9*b*, and 9*c* show, the environment inside the vial remained at a substantially constant relative humidity of between about 18 and about 24%. As further shown in FIGS. 9*a*, 9*b* and 9*c*, the relative humidity of the interior of the package "spiked" each time the package was opened. However, once the lid was closed, the relative humidity of the interior of the package returned to the previous substantially constant relative humidity. Consequently, the composition of the present invention absorbed the excess moisture in the vial, which was caused by the repeat openings of the vial lid in the environment chamber. And, when the vial lid was closed, the environment inside the vial returned to the substantially constant relative humidity.

EXAMPLE 2

FIG. 10 describes the composition of samples 18-11, 18-12, 18-15, 18-16 and 18-18 that were in the shape of a sleeve. "Polyox" is a polyethylene oxide manufactured by Union Carbide. "Zinc Bromide" was manufactured by Sigma Chemicals with catalog number Z1000. "Silica Gel" is a silica gel manufactured by W. R. Grace & Co. "Exact 4023" is an ethylene-olefin copolymer manufactured by Exxon Chemical Company. "Carbopol" is an acrylic polymer for thickening manufactured by B. F. Goodrich. The materials were first mixed to produce a substantially uniform mixture. The mixture was then extruded at about 100 degrees C. to form pellets. The pellets were then injection molded to form a sleeve.

The objective was to maintain a target of 18% Rh. The samples were placed in a closed container (i.e a Capitol Vial No. 219 vial) with an Onset logger to record the Rh inside the vial. The internal contents of the vial was allowed to reach a constant Rh. After the Rh was stabilized, 5% by sleeve weight of water (i.e. 0.5 ml) was added. Twice a week, the Rh was checked and more water was added as needed. FIG. 11 (ml. of water added total) details the amount of water added to each sample over time. FIGS. 12 (% Rh), 13 (moisture absorbed in grams), and 14 (% of initial sample weight absorbed) show the results over time. As can be seen, samples 18-11, 18-12, 18-15 and 18-16 maintained the target of 18% Rh over time.

Monolithic compositions having the capability of maintaining a substantially constant relative humidity have been described herein. As previously stated, detailed embodiments of the present invention are disclosed herein; however, it is to be understood that the disclosed embodiments are merely exemplary of the invention that maybe embodied in various forms. It will be appreciated that many modifications and other variations that will be appreciated by those skilled in the art are within the intended scope of this invention as claimed below without departing from the teachings, spirit and intended scope of the invention.

What is claimed is:

1. An article of manufacture comprising a monolithic composition for maintaining a substantially constant relative humidity formed by combining at least the following components:

a polymer having a solubility in water below about 0.1% at 25° C. and atmospheric pressure;

a hydrophilic agent is at least about 5% by weight of the polymer and is selected from the group consisting of polyglycols, poly(ethylene glycol), poly(propylene glycol), EVOH, pentaerithritol, PVOH, polyvinylpyrollidine, vinylpyrollidone or poly(N-methyl pyrollidone), and saccharide based compounds, glucose, fructose, and their alcohols, mannitol, dextrin, and hydrolized starch and mixtures thereof; and a deliquescent material;

wherein the composition comprises at least three phases and has interconnecting channels with the deliquescent material in or adjacent to these channels.

2. An article of manufacture comprising a monolithic composition for maintaining a substantially constant relative humidity comprising at least the following components:

(a) a polymer having a solubility in water below about 0.1% at 25° C. and atmospheric pressure;

(b) a hydrophilic agent is at least about 5% by weight of the polymer and is selected from the group consisting of polyglycols, poly(ethylene glycol), poly(propylene glycol), EVOH, pentaerithritol, PVOH, polyvinylpyrollidine, vinylpyrollidone or poly(N-methyl pyrollidone), and saccharide based compounds, glucose, fructose, and their alcohols, mannitol, dextrin, and hydrolized starch and mixtures thereof; and (c) a deliquescent material;

wherein the composition comprises at least three phases and has interconnecting channels with the releasing agent in or adjacent to these channels.

3. The article of manufacture of claim 2 wherein the polymer is a thermoplastic.

4. The article of manufacture of claim 2 wherein the hydrophilic agent is a polyglycol.

* * * * *